(12) United States Patent
Almon

(10) Patent No.: US 9,160,606 B2
(45) Date of Patent: Oct. 13, 2015

(54) REMOTE ACCESS SYSTEM FOR USING SCIENTIFIC ALGORITHMS IN LOCAL DATA PROCESSING

(71) Applicant: John D. Almon, Stafford, TX (US)

(72) Inventor: John D. Almon, Stafford, TX (US)

(*) Notice: Subject to any disclaimer, the term of this patent is extended or adjusted under 35 U.S.C. 154(b) by 323 days.

(21) Appl. No.: 13/693,181

(22) Filed: Dec. 4, 2012

(65) Prior Publication Data

US 2014/0156727 A1 Jun. 5, 2014

(51) Int. Cl.
*H04L 29/08* (2006.01)
*H04L 29/06* (2006.01)
*G06Q 20/12* (2012.01)

(52) U.S. Cl.
CPC ...... *H04L 29/08072* (2013.01); *G06Q 20/1235* (2013.01); *H04L 63/0428* (2013.01); *H04L 67/1097* (2013.01); *H04L 2463/102* (2013.01)

(58) Field of Classification Search
USPC .......................................................... 709/203
See application file for complete search history.

(56) References Cited

U.S. PATENT DOCUMENTS

| 2005/0177873 A1* | 8/2005 | Wu et al. .......................... 726/26 |
| 2008/0140537 A1* | 6/2008 | Powell ............................. 705/26 |
| 2013/0166417 A1* | 6/2013 | Pulkowski et al. .......... 705/27.1 |

* cited by examiner

*Primary Examiner* — Tu Nguyen
(74) *Attorney, Agent, or Firm* — Blank Rome LLP

(57) ABSTRACT

A remote access system for processing local data with a computing algorithm stores information on various computing algorithms available via the system. A remote user at a user system selects an algorithm, which is then encrypted and downloaded to the user system. The downloaded algorithm is decrypted and stored in host memory in a controlled manner. Alternatively, the selected algorithm may be offered through cloud processing, in which case the user uploads local data for cloud processing. In this case, the system manages the cloud processing at remote providers and tracks heuristic, caching, and performance. In either case, the local data is processed with input parameters from the user, and visual results are provided to the user along with a cost for storing final results of the processing. Once the user makes the required payment, the final results can be stored locally at the user system.

46 Claims, 11 Drawing Sheets

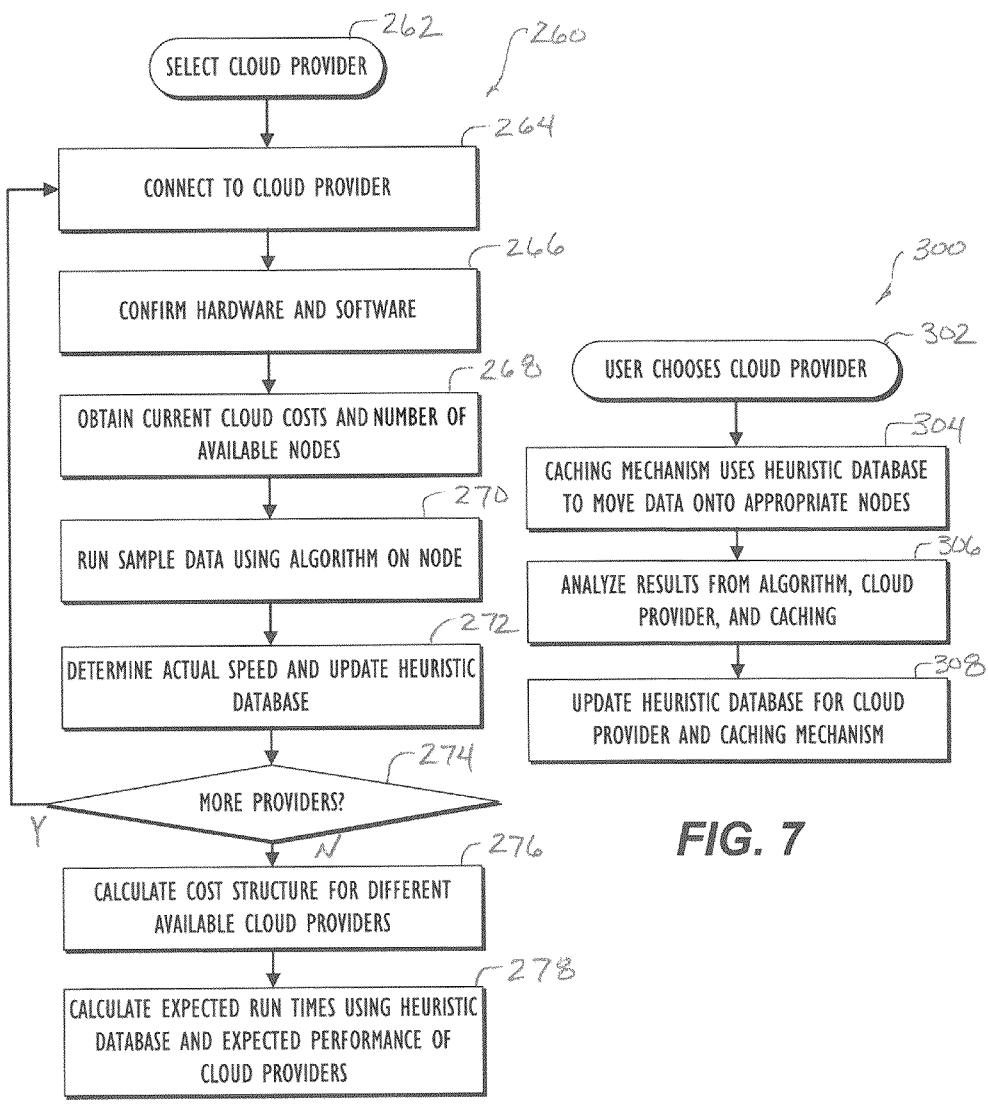

REMOTE ACCESS SYSTEM FOR USING SCIENTIFIC ALGORITHMS IN LOCAL DATA PROCESSING

BACKGROUND OF THE DISCLOSURE

Many industries use scientific algorithms to process data for various purposes. For example, seismic data processing services use various types of algorithms to process complex sets of data to provide seismic imaging and other services for clients. As will be appreciated, there are a host of algorithms for processing data, such as seismic data. Some algorithms require more or less resources, and some algorithms may actually be proprietary.

The computing infrastructure required to process complex sets of data with scientific algorithms is not always available to the typical user. Instead, users must use an outside data processing service to process the user's data and provide results. Although current circumstances may be acceptable in some instances, users may never be able to use (or even just try out) certain algorithms for themselves without making extensive arrangements with outside parties who provide the algorithms and computing services.

The subject matter of the present disclosure is directed to overcoming, or at least reducing the effects of, one or more of the problems set forth above.

SUMMARY OF THE DISCLOSURE

A remote access system for processing local data with a computing algorithm stores information about various computing algorithms available via the system. A remote user at a user system can selects a computing algorithm, which is encrypted and downloaded to the user system. The downloaded computing algorithm is then decrypted and stored in host memory at the user system in a controlled manner. Alternatively, the selected computing algorithm may be offered through cloud processing, in which case the user uploads the local data to the system. In this case, the system manages the cloud processing at remote providers and tracks heuristic, caching, and performance information. In either case, the local data is processed with one or more input parameters from the remote user, and visual results are provided to the remote user along with a cost for storing final results of the processing. The visual results provided may only be partial results. Once the remote user makes a required payment, the final results from the processing can be stored locally at the user system.

The foregoing summary is not intended to summarize each potential embodiment or every aspect of the present disclosure.

BRIEF DESCRIPTION OF THE DRAWINGS

FIG. 6 illustrates additional details for obtaining heuristic data in the disclosed system.

FIG. 7 illustrates additional details for data caching in the disclosed system.

DETAILED DESCRIPTION OF THE DISCLOSURE

Figure 1:
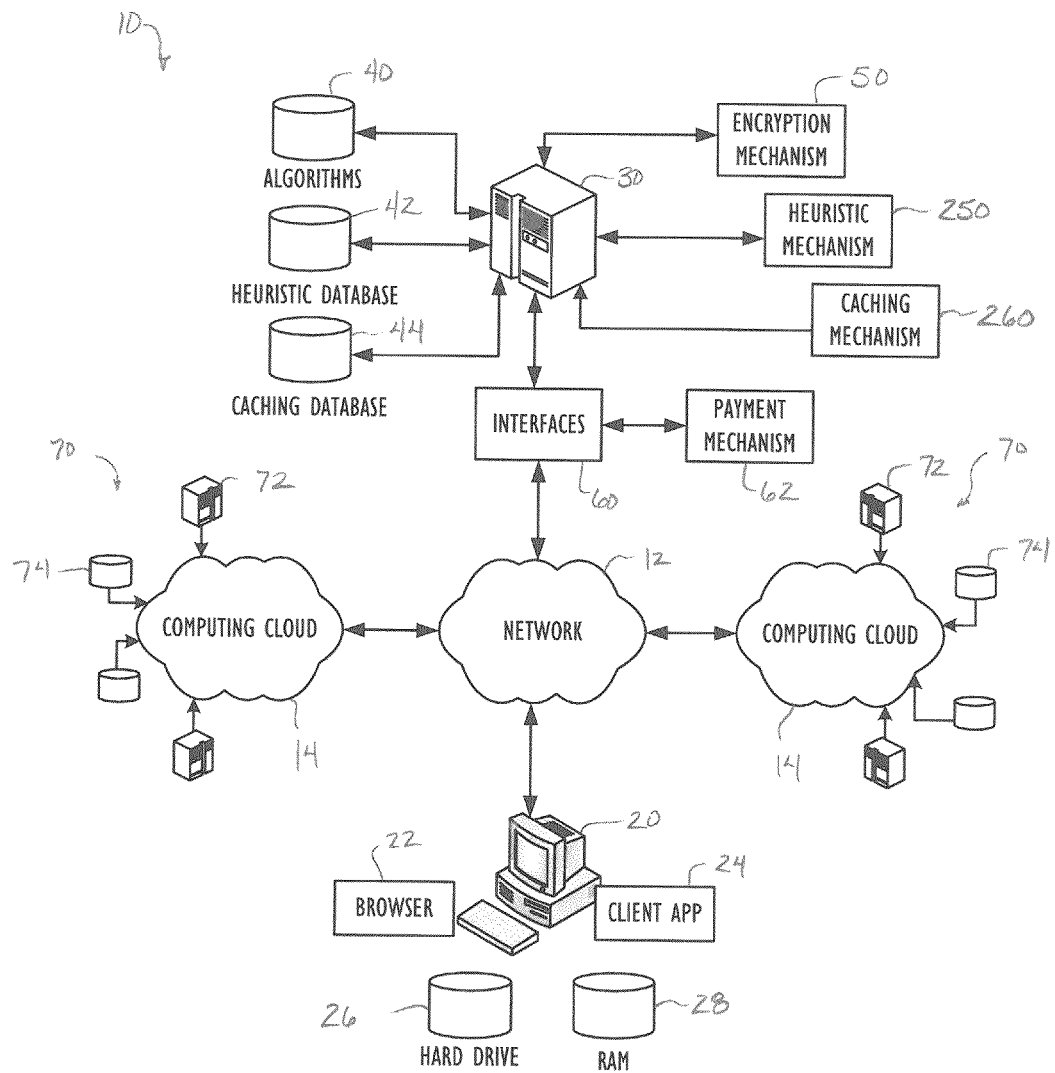
FIG. 1 is a schematic diagram of a remote access system for using scientific algorithms in local data processing.

In the schematic diagram of FIG. 1, a remote access computing system 10 according to the present disclosure allows remote users to access any of a number of scientific computing algorithms and use a selected algorithm to process the user's local data. The system 10 provides scientific computing to remote client users, who can parameterize and visualize results of the scientific computing algorithm on local data before paying for the service. The client user can parameterize and perturb the variables and operation of the algorithm to see how the algorithm functions with the client's data. Ultimately, the client user needs to actually pay for the use of the processing and the algorithm before obtaining full results of the computation. Thus, the client user when satisfied with the visual results provided can then pay through the system 10 to save or apply their results.

In general, the system 10 includes one or more system servers 30 and associated computing hardware. For ease of description, the one or more system servers 30 and components are simply referred to herein as a "system server," although it will be appreciated that the system 10 can use a number of severs and components known and used in the art. The system server 30 stores information on various scientific computing algorithms 40, heuristic and historical information in a heuristic database 42, and caching details in a caching database 44.

The system server 30 uses various processes or mechanisms, including an encryption mechanism 50 for encrypting the algorithms 40, a heuristic mechanism 250 for populating the heuristic database 42, and a caching mechanism 260 for populating the caching database 44. Finally, the system server 30 has various interfaces 60 to provide client users with remote access to scientific computing algorithms and computing services.

A client user can access the system server 30 via one or more networks 12, such as the Internet, using a web browser 22 or the like on the client system 20, which can be a computer, terminal, or any other standard type of computer system for a remote user. The connection between the client system 20 and the system server 30 can operate as a web service or as a web processing service (WPS) based on an appropriate standard. For example, the connection can be a web processing service based on OpenGIS® Web Processing Service (WPS) Interface Standard, which can be used to describe a processing service (calculation). (OPENGIS is a registered trademark of Open Geospatial Consortium, Inc.) The WPS interface standard standardizes how inputs and outputs (requests and responses) are handled by a processing service (calculation) so the processing service can be executed as a web service. Although originally designed for geospatial data, the WPS interface standard can be used with various types of data, including scientific computing data as disclosed herein.

Also connecting to the system server 30 via the one or more networks 12 is a number of cloud computing services, which include cloud computing providers 70, one or more remote servers 72, one or more databases 74, and associated computing hardware connected through a computing cloud 14. These cloud computing services can provide any combination of computing resources, including hardware, software, storage, etc. to computing algorithms 40 for the system 10. In fact, the providers 70 may themselves offer particular scientific computing algorithms 40 and processing of data. For ease of description, the components associated with these cloud computing services are simply referred to as "cloud computing providers," although it will be appreciated that the system uses a number of servers, components, and the like known and used in the art. Additionally, it should be noted that the system server 30 may itself provide cloud computing services and may constitute a cloud computing provider for the purposes of the present disclosure.

To initiate a web or communication session with the system 10, the client user accesses the system server 30 via the one or more networks 12 and interacts with the system server 30 using the user's web browser 22 and various user interfaces 60 of the system server 30. Accessing the system 10 involves any of the usual protocols, such as login, password verification, client information, etc. If necessary for the type of processing, the user can then upload the local data to the server system 30, which stores it either locally or remotely as discussed herein.

Figure 2A:
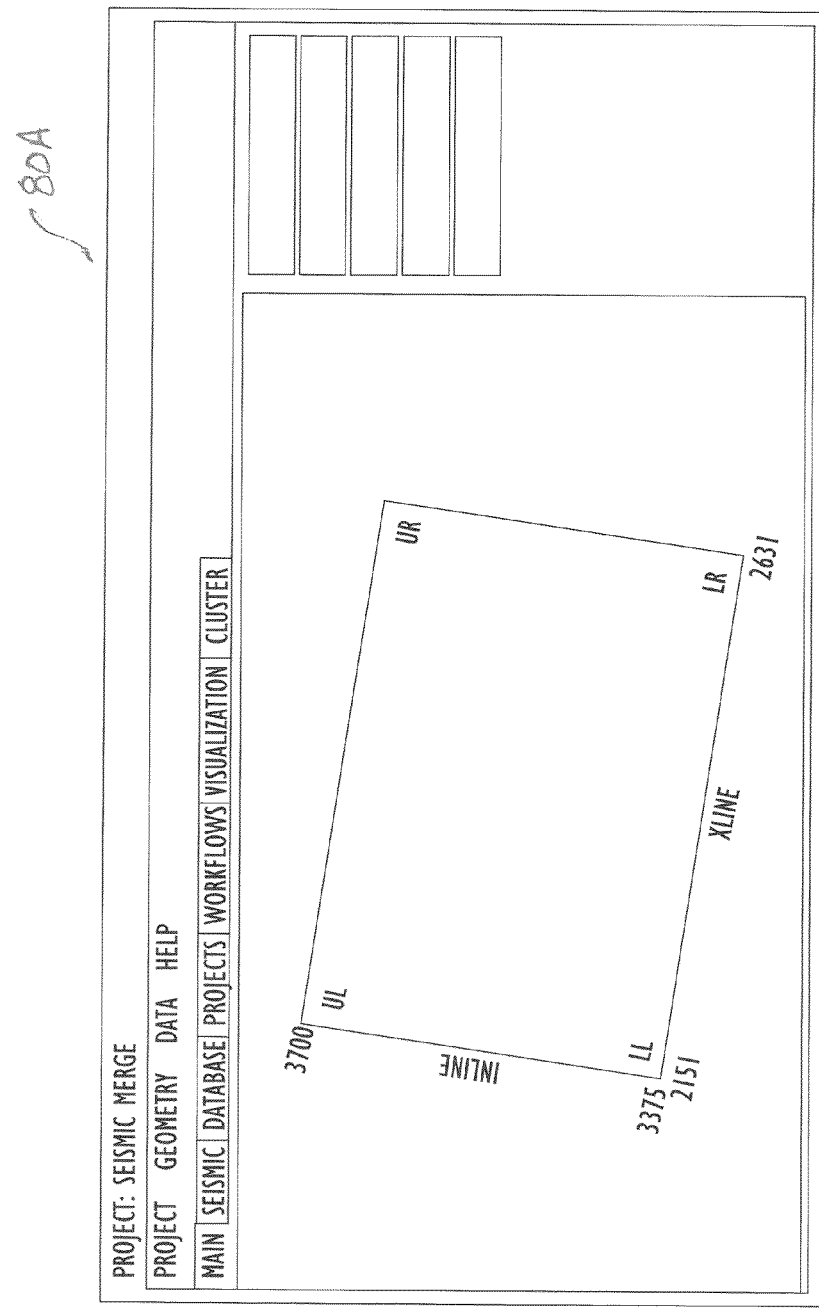
FIGS. 2A-2F show example screens of a user interface for the disclosed system.

For purposes of the present discussion, FIGS. 2A-2F show example screens 80A-80F of a user interface 60 for the disclosed system 10. These screens are based on seismic processing. Other data and algorithms would have different interface screens, inputs, and the like, as will be appreciated by one skilled in the art. As an example, FIG. 2A shows a startup screen 80A after client data is loaded, which in this case is seismic data for a seismic project.

Figure 2B:
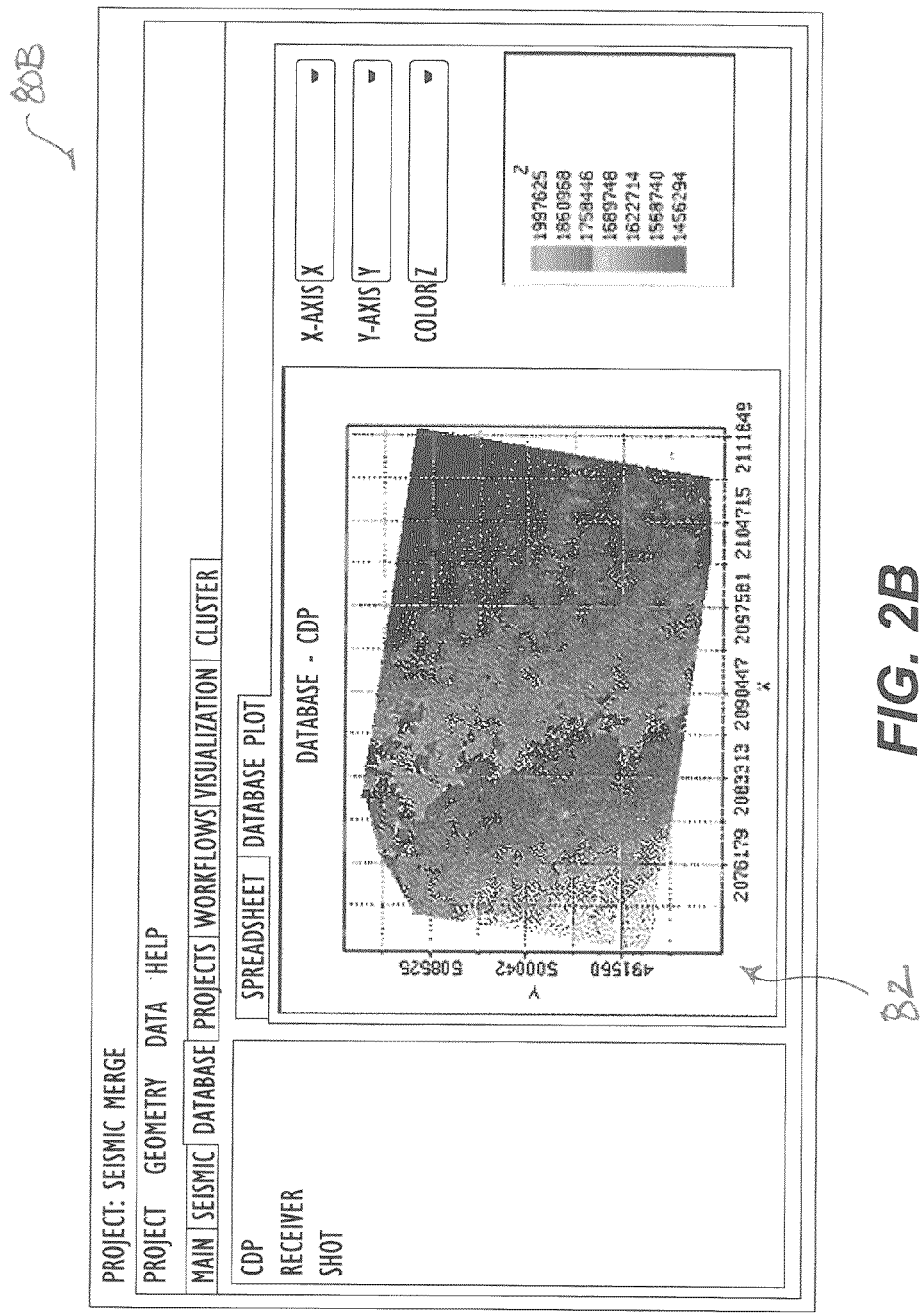

The user can visualize and look at the data without requiring payment to the system server 30. As shown in FIG. 2B, for example, a database screen 80B shows a data base plot 82 of common depth point (CDP) values for seismic exploration data. Other types of data would have different graphical representations for the data in such a screen.

Figure 2C:
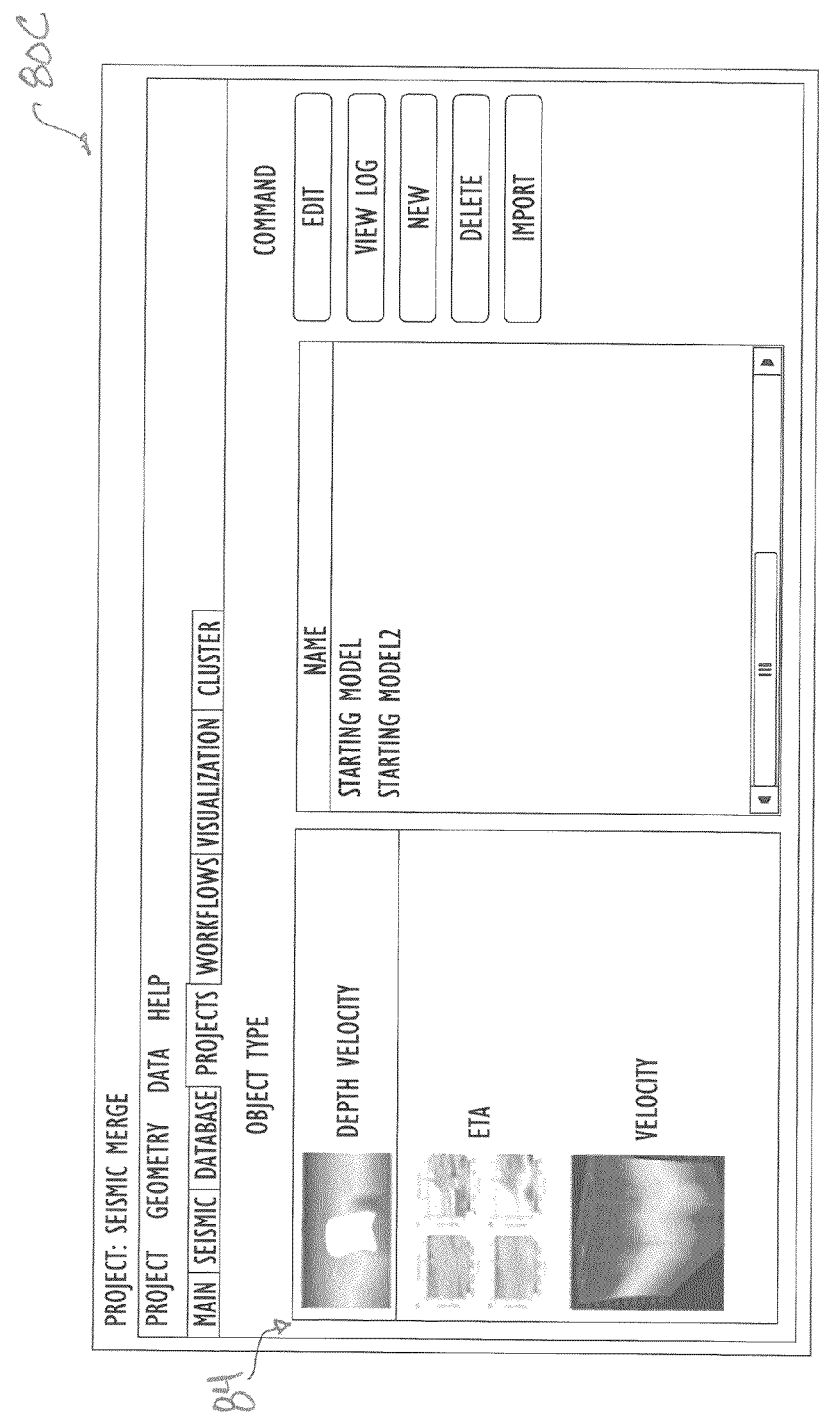

As shown in FIG. 2C, the user can browse through a technology browser screen 80C having various algorithms that can be used on the data. Again, the types of algorithms depicted are for seismic data, such as depth velocity calculations, Eta field velocity modeling, and velocity calculations, among other possibilities. Other data processing areas would offer different algorithms.

Figure 2D:
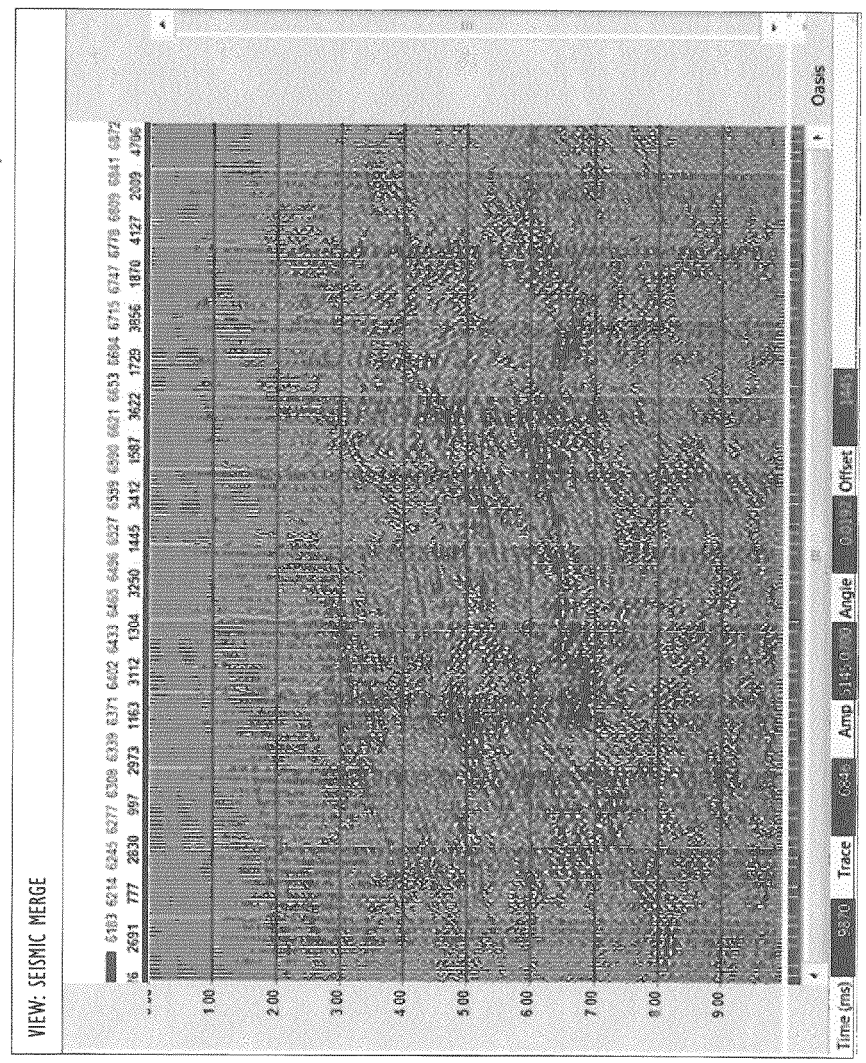

After reviewing details of what algorithms 40 are available via the system server 30, the user may then wish to try a particular scientific computing algorithm to process the user's local data before actually paying for the computing services. When the user selects a technology in the browser window and then clicks on a data set, the user can view the entire data set before the algorithm is applied. For example, FIG. 2D shows a seismic viewer screen 80D in the present example for viewing seismic data 86.

At this point and as discussed in more detail later, the user selects a particular algorithm 40 so the user's local data can be processed. The algorithm 40 may be stored in memory associated with the system server 30 or may be stored in a repository on a remote site (not shown). Either way, because the algorithm 40 may include proprietary software algorithms provided by the system server 30 and owned by a third party, the system server 30 does not allow naked download of the algorithm 40 on the user's device 20. Thus, the algorithm 40 will not be stored on the hard drive 26, removable media, network accessible storage, etc. associated with the client system 20.

Instead, in one embodiment, the system server 30 uses the encryption mechanism 50 to encrypt discrete processing components of the algorithm 40 and can use a number of security schemes to restrict access to the algorithm 40. In particular, a pre-installed client application 24 running on the user's device 20 handles download of the encrypted algorithm 40 and uses a current web or communication session and tracking in a web-based link to the system server 30 to control access to (and use of) the downloaded algorithm 40. The client application 24 can then decrypt the algorithm 40 at time of use in the host memory (i.e., RAM 28) only so that the algorithm 40 is never stored on the client's hard drive 26 or other memory location. In fact, for the purposes of encryption and security, the client application 24 can map the downloaded algorithm in the host memory under the current web session between the client system 20 and the system server 30. This mapping can keep other processes from reading from that mapped memory to access details of the algorithm 40. As will be appreciated, these and other security measures can be used to limit local access to the encrypted algorithm 40 and the processing performed on the client system 20.

The encryption mechanism 50 can use any one of various types of software encryption schemes known in the art to encrypt the algorithm 40. As one example, the system 10 can use encryption based on an Advanced Encryption Standard (AES) encryption specification, which uses a symmetric-key for both encrypting and decrypting. Accordingly, the client application 24 can have a user ID and a license key for decryption that must match the user ID and the license key used by the system server 30 for encryption.

In another embodiment, the system server 30 uses cloud computing to process the algorithm 40 so that the encrypted algorithm 40 does not need to be handled by the client system 20. In this cloud computing arrangement, the system server 30 is itself capable of scientific computing of various algorithms 40 or is associated with a number of remote servers 72 either provided by the same system server 30 or by third party cloud computing providers 70. The system server 30 arranges and manages cloud computing sessions with these remote providers 70 to offer the scientific computing desired by the client.

Figure 2E:
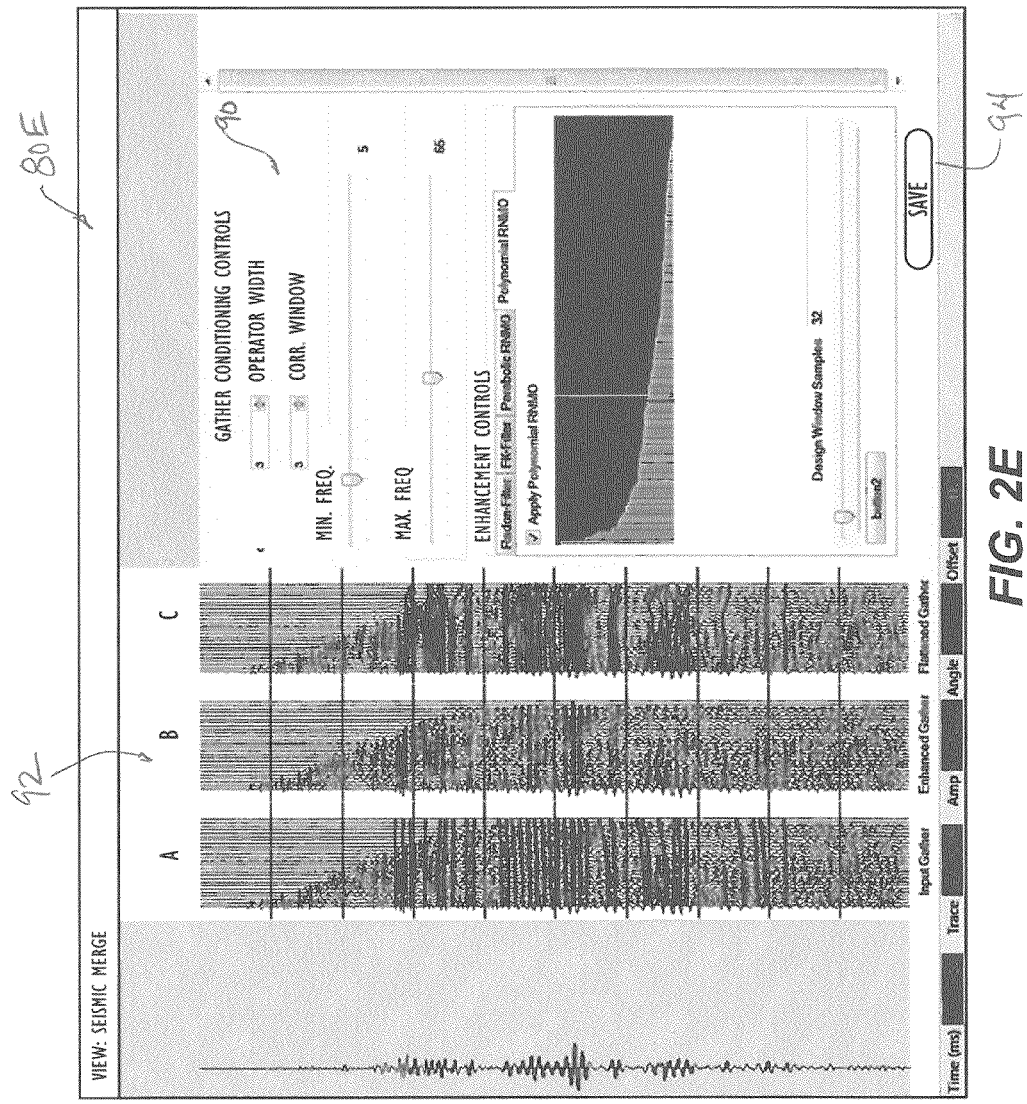
Figure 2F:
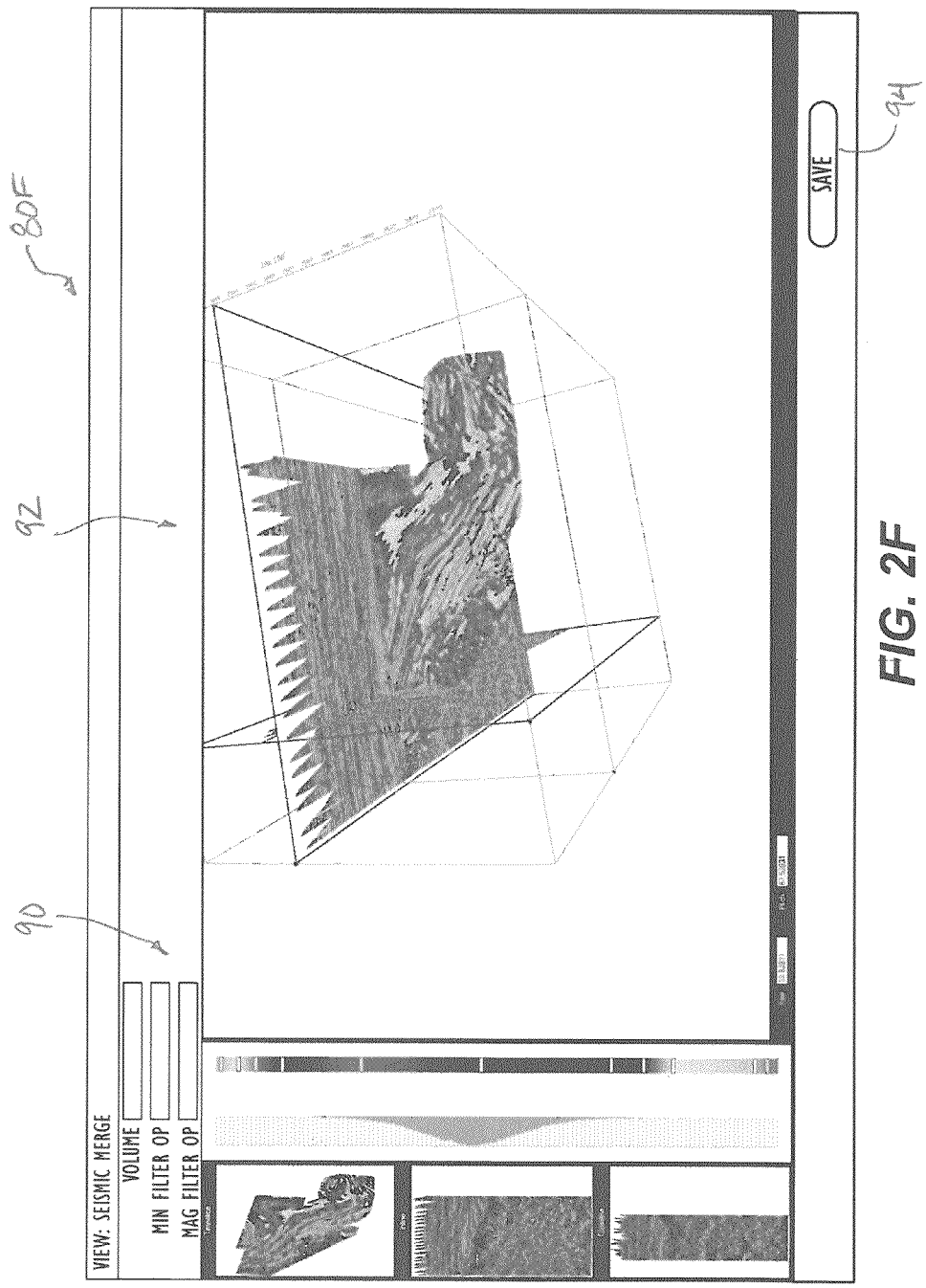

Once the user has selected an algorithm for local or cloud processing, the client user can input parameters, variables, and other inputs for the algorithm 40 to process the client's data. To vary the results provided, the system 10 perturbs the input parameters. As shown in FIGS. 2E-2F, for example, seismic viewer screens 80E-80F show subsets of the data with different perturbations applied. Although full results can be shown, the visual results provided to the user may in general be partial results of the processing on the client's data. Moreover, the display of results to the user may be time restricted or controlled in other ways. As shown, the user can parameterizes the data using various types of inputs 90 (dropdowns, slider bars, data input, enhancements, etc.) for various parameters that depend on the type of data and processing involved. The user can also visualize what is happening to the data by viewing the perturbed results in a graphical or visual display or representation 92. After the user reviews the results and is satisfied with them, the user can then select a confirmation button 94 (i.e., "Apply", "Calculate" or "Save" button) on the user interface screen 80E-80F to then save the detailed results at the client system 20.

At this point, the payment mechanism 62 of the system 10 provides the user with a payment window (not shown) or the like to confirm the amount and payment. Once the payment is approved, the computing algorithm is applied to the entire volume of data so that full results are generated, if not already done. Further, as noted below, the full results can then be stored on the client system 20.

With a general understanding of the system 10 of the present disclosure, discussion now turns to particulars related to remote access of the scientific computing provided.

Figure 3:
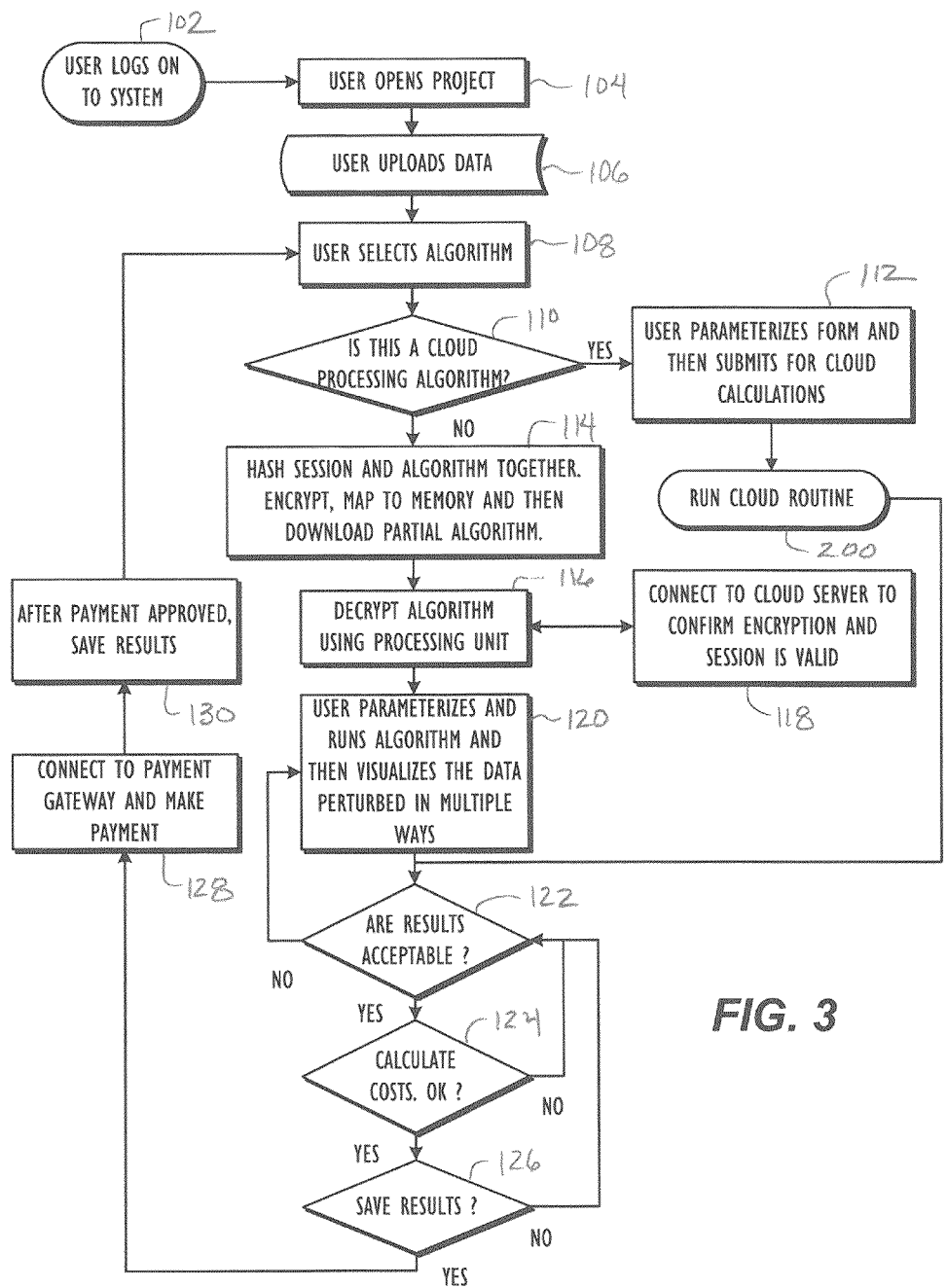
FIG. 3 illustrates a process according to the present disclosure for a remote user to access the disclosed system and use scientific algorithms to process the user's local data.

FIG. 3 shows a first portion of a process 100 for a remote user to access the disclosed system 10 and use scientific computing algorithms to process the user's local data. To start a computing project, the client user runs the client application 24 on the client system 20, connects to the system server 30, and logs on to the system 10 in a session as described previously (Block 102). The user then opens a project (Block 104) and uploads data from an external source to the system server 30 for the project if necessary for the type of computing used (Block 106). In general, the user provided data may be stored on the user's device 20 or may be stored elsewhere, even on memory associated with the system server 30.

At this point, the user can then browse through the available algorithms 40 for processing the uploaded data. As noted herein, various types of computing algorithms can be provided, including algorithms for seismic data processing, for computational chemistry, finite element analysis, medical calculations, graphics processing, etc. The user may eventually pick one of the algorithms 40 to process the data (Block 108). Once an algorithm 40 is selected, the system server 30 determine if the selected algorithm 40 is a cloud processing algorithm or not (i.e., whether it is to be processed by the system server 30, one or more cloud processing providers 70 or is to be processed at the client system 20) (Decision 110). If a cloud processing algorithm is selected, then the user parameterizes a form for running the algorithm 40 and submits the parameterizations for calculation on the computing clouds 14 by the providers 70 (Block 112). This involves a cloud routine (Block 200) as described in further detail later.

If the algorithm 40 is not a cloud processing algorithm (no at Decision 110), then the system server 30 hashes details of the web session and algorithm 40 together and encrypts at least a portion the algorithm 40 using the encryption mechanism 50 and an appropriate encryption scheme. At the client, the client application 24 downloads the encrypted algorithm 40 from the system server 30. As noted above, this algorithm 40 is not stored on the client's hard drive 26 and is only stored in temporary memory, i.e., random access memory 28. In downloading the algorithm 40, the client application 24 maps the algorithm 40 to the memory 28 (Block 110). The portion of the algorithm 40 downloaded may be less than the entire algorithm needed to process the data depending on the type of computing involved and the calculations performed.

The client application 24 on the client system 20 then decrypts the algorithm 40 based on the appropriate decryption scheme using the system's graphics processing unit (GPU) or central processing unit (CPU) (Block 116). To verify proper decryption and to be able to proceed further, the client application 24 connected in the web-link to the system server 30 confirms that the encryption/decryption and session are valid (Block 118). This initial validation (as well as subsequent validation) may be needed throughout a processing session for the user to proceed.

The user can now try features of the algorithm 40 locally before actually paying for its processing and usage. To do this, the user parameterizes and runs the algorithm 40 using the client application 24 and the user interfaces 60 during the session. In particular, the user inputs variables for one or more parameters. The system 10 then perturbs the parameters around a standard deviation of the parameters' values (or around some other perturbation point), performs the computations of the algorithm 40 based on the perturbed parameters, and displays the results on a screen to graphically depict the results to the client user. Ultimately, the user can visualize the data perturbed in multiple ways during the session (Block 120). During these steps, the results of the processing are shown on the user's screen, typically in graphical form if suitable for the type of processing and data involved. However, the actual numerical results are not saved to the hard drive 26 on the client's system 20.

The system 10 then inquires whether the results are acceptable to the user (Decision 122). If not, then the user may be able to re-parameterize and run the algorithm 40 again to visualize results differently (Block 120). Once the user is satisfied with the results (yes at Decision 122), the system 10 calculates the costs for processing the data with the selected algorithm 40 under the chosen parameters to provide the desired results to the client, and the system 10 inquires whether the user wishes to proceed by paying the required costs for the processing (Decision 124) and saving the results (Decision 126).

When requested to save the results, the client application 24 connects to the payment mechanism 62 for the user to make payment (Block 128). Various payment arrangements can be used. For example, the client application 24 may obtain payment information and handle payment and verification, or the system server 30 may store account information for the client and may handle payment arrangement automatically.

Once the payment is approved, the system 10 saves the results so the client user can access them (Block 130). In this arrangement, the system server 30 or the client application 24 itself may be "unlocked" to allow saving of actual, numerical results to the hard drive 26 of the client system 20.

As noted above, some of the available algorithms 40 of the system 10 may be handled by cloud processing so the system 10 uses a cloud routine (Block 200: FIG. 3) to handle the processing by one or more processing services 70. To better handle the cloud processing, the system 10 maintains and checks the heuristic database (42: FIG. 1) containing information about the algorithms 40 and the cloud processing providers 70. As provided in more detail later, the heuristic database 42 keeps track of performance metrics for the cloud providers 70 (servers 72, databases 74, etc.) and the algorithms 40, and the tracked information can be directly associated with particular client users and preferences. The heuristic database 42 can also keep track of information about the client users. The information in the heuristic database 42 is then used for both the cost estimates and the run-time estimates for providing cloud computing services for client users.

Because it may be impractical to complete and maintain exhaustive discovery of the various characteristics, behaviors, and other details related to the algorithms 40, the providers 70, the users, and the like as well as related to the permutations between these elements, the information in the database 42 is preferably compiled and analyzed based on statistics, grouping, trending, abstraction, estimation, and/or other forms of analysis. In this sense, "heuristic information" as used herein may refer to compiled and analyzed information.

As also discussed in more detail later, the heuristic information in the database 42 are also used for caching of data for maximum throughput for long-running cloud algorithms 40. Being able to effectively cache data across resources of the cloud providers 70 in the computing clouds 14 can facilitate processing, reduce run-times, and limit costs. Thus, using information in the heuristic database 42, the system server 30 can also synchronizes uploaded project data automatically to offsite server(s) 72 and databases 74 for cloud processing when appropriate. To do this, the system server 30 uses the caching mechanism 260 to optimize volume caching between memories, hard drives, remote file systems, clouds, and networks for large data volumes. The caching mechanism 260 is based on the data size, actual hardware environment, and the access patterns of the algorithms 40 (i.e., some algorithms may or may not allow certain partitioning of the data during processing). The caching mechanism 260 can also use historical behavior of particular client users and knowledge of how a particular algorithm 40 is used.

Figure 4:
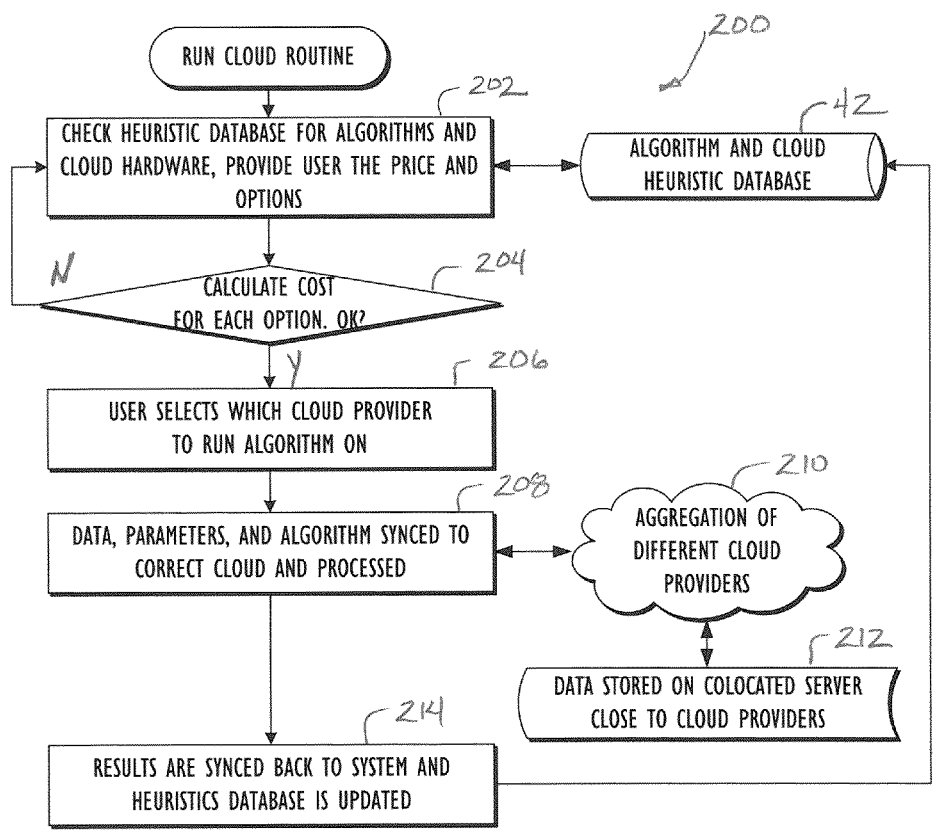
FIG. 4 illustrates cloud processing details of the disclosed system.

Turning then to FIG. 4, cloud processing details for the disclosed system 10 are shown for the remote user to use scientific computing algorithms to process the user's local data. When the user has accessed the system server 30, uploaded their data, selected a cloud processed algorithm 40, and parameterized information for the processing (Blocks 102 to 112: FIG. 3), the system server 30 starts the cloud routine 200 by checking the heuristic database 42 for algorithms and cloud hardware available at the current time and gives the user prices and options for selecting cloud processing by certain available providers 70 (Block 202). To do this, the system server 30 has developed heuristic data in the heuristic database 42 and has assigned costs for various cloud processing providers 70 based on previous analysis and processing as will be described later.

The user may request the system 10 to calculate the cost for each option available (Decision 204), and the user can select which cloud processing provider 70 to use for processing the previously selected algorithm 40 (Block 206). The user's data, parameters, and the selected algorithm 40 are then synced to the correct cloud processing provider(s) 70 and processed (Block 208). The cloud processing may actually be performed by an aggregation of different cloud providers 70, servers 72, databases 74, etc. so that the system server 30 may be configured to handle the coordinated processing (Block 210). Additionally, the user's data may be stored during the processing on collocated servers (not shown) of the system 10 that are associated with the system 10 and located close to the cloud processing providers 70 (Block 212).

In the cloud-based aggregation of different providers 70, servers 72, databases 74, etc., the system server 30 aggregates the available computing resources in one or more locations and provides the client user with a single interface for cloud aggregation. In this way, the client user can access cloud computing resources via the system 10, while the system server 30 determines heuristically which cloud computing algorithm 40 would be best processed by which cloud provider 70. The determination is based on available cloud computing hardware and particulars of the algorithm 40 involved. In this way, the system server 30 can heuristically determine the best cloud hardware/network speed to optimize pricing for the algorithm 40 across one or more clouds computing resources (providers 70, servers 72, databases 74, etc.). Further details are provided later about such heuristic determinations.

Eventually, after processing is completed, results from the processing are synchronized back to the system server 30, and resource information from that processing is used to update the heuristics database 42 for the computing provided (Block 214). The user at the client system 20 can then view the processing results through the interfaces 60 with the system server 30 so that operation of the system 10 at this point can be similar to the previous arrangement in FIG. 3. For instance, the user can indicate that the results are acceptable (Decision 122: FIG. 3), can proceed by paying for the processing (Block 128: FIG. 3), and save the results (Block 130: FIG. 3). in the end, the system 10 permits the remote user to save storable results of the processing after verifying the payment of the cost and releasing a restriction on storing the storable results on the client system 20.

As noted above, the system 10 maintains and checks the heuristic database 42 containing information about the cloud processing providers 70 and the algorithms 40. Because the providers 70 may have different hardware and processing capabilities—some better suited for certain types of algorithms 40 and data than others, the system 10 keeps track of these capabilities and the historical information about the processing in the heuristic database 42. Then, when cloud processing of an algorithm 40 is requested by the user, the system 10 uses the information in the heuristic database 42 to better handle the processing of the selected algorithm 40 for the user.

Figure 5:
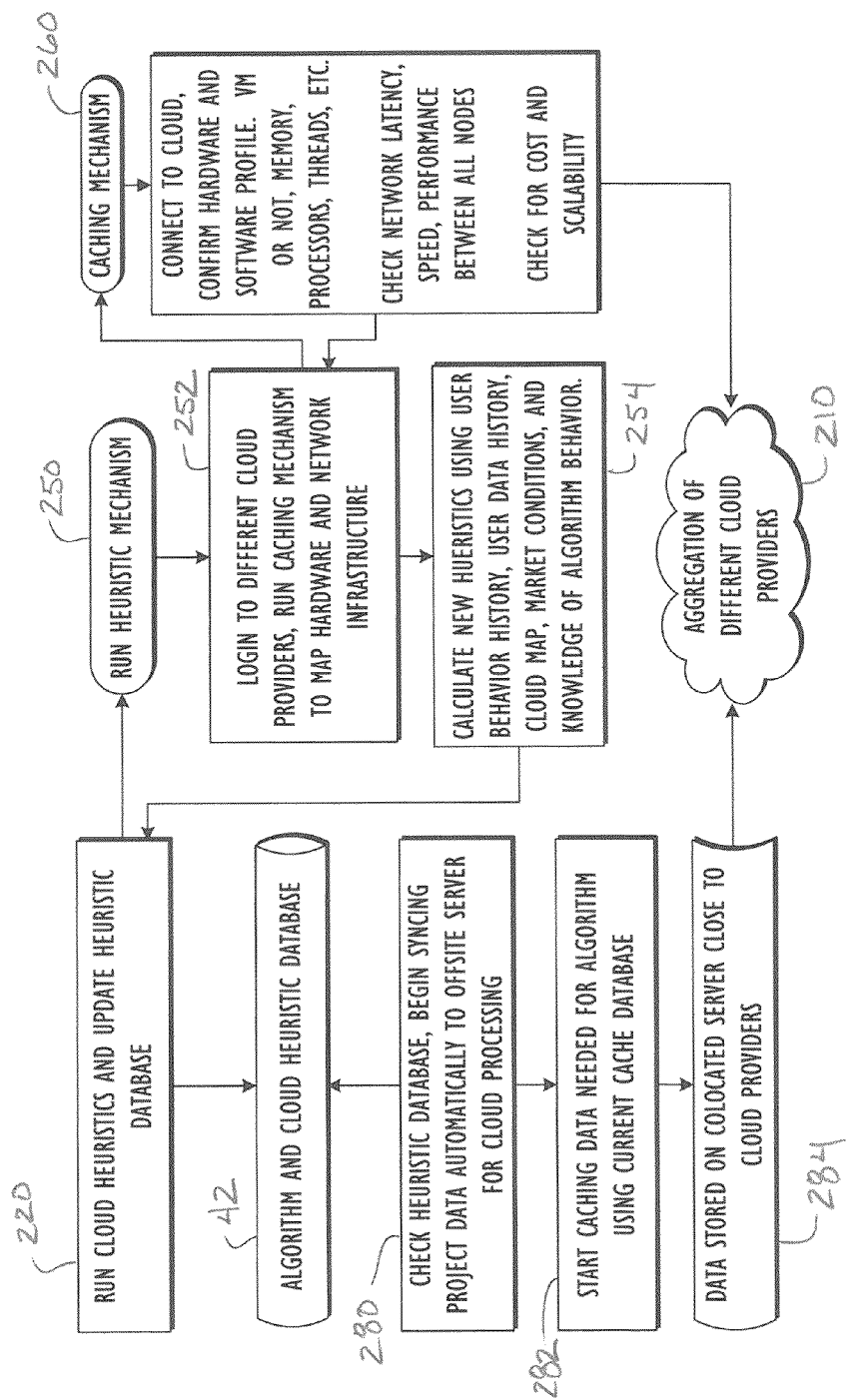
FIG. 5 illustrates heuristics and data caching details for cloud processing with the disclosed system.

Turning now to FIG. 5, heuristics and data caching details are shown for cloud processing in the disclosed system 10. In the background of client processing discussed previously, the system server 30 periodically runs the cloud heuristics mechanism (250) and updates the heuristic database 42 with information about the cloud resources—e.g., what cloud servers 72 are available, what processing capabilities are in use, etc. (Block 220). A number of network monitoring techniques can be used to monitor, track, and assign the cloud processing resources.

For instance as shown in FIG. 5, the system server 30 periodically runs the heuristics mechanism (250) in which the system server 30 logs into each different cloud service provider 70 and runs the caching mechanism (260) to map the hardware and the network infrastructure of the cloud provider 70 (Block 252).

The caching mechanism (260) is a process in which the system server 30 connects to the cloud provider 70 and confirms/maps the hardware and software profile available. Further details are discussed below with reference to FIG. 6. In general, however, the system server 30 determine whether the cloud provider 70 is a virtual machine or not, what memory is available, what processors are available, what threads are being processed, etc. The system server 30 also checks communication resources, such as the network latency, speed, performance, and the like between the nodes, and check for costs and scalability. As noted previously, the cloud processing can use an aggregation of different cloud providers 70 so that the heuristic and caching mechanisms (250 and 260) can determine their information based on such aggregations.

After running the caching mechanism (260) and mapping hardware and network infrastructure (Block 252), the system server 30 calculate new heuristics using user behavior history, user data history, a map of the cloud's hardware, market conditions, and knowledge of a given algorithm's behavior (Block 254). For example, heuristics for the cloud providers 70 and algorithms 40 can be associated with a given user and can account for the behavioral history for the given user, such as what type of data processing the user usually requires, what costs and processing speeds the user prefers, etc. The heuristics for the providers 70 and algorithms 40 for the given user can also account for the amount, type, and quality of data typically provided by the given user. The heuristics for the providers 70 and algorithms 40 can also dynamically adjust prices for processing the algorithm based on current market conditions. As will be appreciated by one of ordinary skill in network processing, these and other such details may be taken into consideration to compile information for the heuristic database 42.

The entire procedures of Blocks 220 to 260 may occur in the background and as a precursor to any client related activity so that the heuristic and caching databases 42 and 44 are populated with information. When a user has actually selected a cloud processing algorithm 40, the system server 30 can begin allocating the user's uploaded data to the appropriate cloud providers 70 automatically based on the previous heuristics and caching information stored in the databases 42 and 44. In particular as shown in FIG. 5, the system server 30 checks the caching database 42 and begins syncing the user's project data automatically to the offsite providers 70, servers 72, databases 74, etc. for cloud processing (Block 280). In this process, the system server 30 start caching data needed for the algorithm 40 using the current information stored in the caching database 44 that was obtained with the caching mechanism 260 as noted above. Again, the system 10 may use an aggregation of different cloud providers 70 and may store data on co-located servers close to the cloud providers 70 (Blocks 210 and 284), as discussed previously.

As noted above, the system 10 uses heuristic and caching mechanisms 250 and 260 to obtain information on different cloud processing providers 70 for use by the system 10 when needed. Turning to FIGS. 6 and 7, additional details for heuristic and caching mechanisms 250 and 260 for the disclosed system 10 are shown.

To develop the heuristics for caching, the system server 30 in the heuristic mechanism 250 selects one of the cloud providers 70 (Block 262), connect to the cloud provider 70 (Block 264), and confirms/maps the existing hardware and software profiles of the cloud provider 70 (Block 266). Various profile details can be determined and confirmed. For example, the system server 30 can confirm whether the cloud provider 70 uses virtual machine or not, can confirm the size of available memory, the available speed of the memory, the available speed of the provider's processors, the number of threads handled, the size and performance of on-chip caches available, and the available speed of the provider's memory bus. Additional profile details include the type and speed of hard drives, the type and performance of any processing units (CPUs or GPUs), and any communication resources and information (e.g., the network latency, the speed, and the performance between all nodes). As will be appreciated, these and other processing and networking details may be considered and confirmed.

After confirming the profile details from the cloud provider 70, the system server 30 obtains the current cloud costs and the number of available nodes for the cloud provider (Block 268) and runs sample data using a chosen algorithm on a node to determine actual speed and update the heuristic database 42 (Block 270). Sample data can be run on different algorithms and different types of algorithms for more comprehensive characterization of the provider 70 and its processing and caching capabilities.

The system 10 determines whether there are more providers 70 (Decision 274) and repeats the process (Blocks 264 to 274) as necessary. In the end, the results from the confirmed hardware and communication resources are compiled to calculate cost structures for the available cloud providers 70 (Block 276). From the compiled results, the system server 30 further calculates the expected run-times using the heuristic database 42 and the current expected performance of the cloud providers 70 (Block 278).

The details in the heuristic database 42 and the caching database 44, including the cost structures, the expected run-times, and the current expected performance of the cloud providers 70 are now available for use by the system server 30 when a user has chosen a cloud processing algorithm (See Decision 110: FIG. 3). Moreover, the system 10 uses such details when the user chooses a cloud provider 70 based on the available details (Block 204: FIG. 4).

As shown in FIG. 7, when the user chooses a cloud provider 70 (or aggregation of them) (Block 302), the caching mechanism (260) uses the details in the heuristic database 42 and the caching database 44 to begin moving the data onto the appropriate nodes associated with the user's choices (Block 304). This process uses various caching rules provided by the caching mechanism (260) and stored in the caching database 44. These caching rules can be based on industry standard procedures used for optimizing caching so they are not detailed herein.

The cloud processed algorithm 40 can then be run as requested by the user. To complete the collection of details, the system server 30 analyze results from the algorithm 40, cloud provider 70, and caching (Block 306), and the heuristic database 42 and the caching database 44 are updated for the cloud provider 70 after the user's algorithm 40 is run based on the actual performance results (Block 308). This historical data can further refine the heuristics and caching used during later processing by the system 10 for the indicated algorithm 40, provider 70, and/or user.

The techniques of the present disclosure can be implemented in digital electronic circuitry, or in computer hardware, firmware, software, or in combinations of these. Apparatus for practicing the disclosed techniques can be implemented in a programmable storage device or computer program product tangibly embodied in a machine-readable storage device for execution by a programmable processor or control device; and method steps of the disclosed techniques can be performed by a programmable processor executing a program of instructions to perform functions of the disclosed techniques by operating on input data and generating output.

The disclosed techniques can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A remote data processing method, comprising:
storing first heuristic information at a server system about a plurality of cloud processing services;
storing first information about a plurality of computing algorithms available via the server system at one or more of the cloud processing services;
receiving, at the server system, input data from a remote user;
receiving, at the server system, a selection of one of the computing algorithms from the remote user;
determining which one or more of the cloud processing services provide processing of the selected computing algorithm;
determining, at least from the first heuristic information, a cost for processing the input data with the selected computing algorithm by the one or more determined cloud processing services; and
receiving, at the server system, a selection of the one or more determined cloud processing services from the remote user to perform the processing.

2. The method of claim 1, wherein in response to the selection from the remote user, the method comprises:
encrypting at least a portion the selected computing algorithm;
downloading the encrypted computing algorithm to a user system of the remote user;
decrypting the downloaded computing algorithm at the user system;
providing visual results of the decrypted computing algorithm at the user system by processing local data with one or more input parameters;
providing the cost for storable results of the processing; and
permitting the user system to save the storable results of the processing in response to payment of the provided cost.

3. The method of claim 2, wherein decrypting the encrypted algorithm at the user system comprises controlling access to the decrypted algorithm at the user system.

4. The method of claim 3, wherein controlling access to the decrypted algorithm at the user system comprises:
mapping memory for storing the decrypted algorithm at the user system; and
preventing storage of the decrypted algorithm outside of the mapped memory.

5. The method of claim 3, wherein controlling access to the decrypted algorithm at the user system comprises:
establishing a communication session between the server system and the user system; and
confirming that the communication session and the encryption and decryption of the computing algorithm are valid.

6. The method of claim 2, wherein encrypting the portion the selected algorithm comprises encrypting the portion of the algorithm with a key required for decryption.

7. The method of claim 1, wherein storing the first heuristic information at the server system about the cloud processing services comprises compiling the first heuristic information at the server system about the cloud processing services.

8. The method of claim 7, wherein compiling the first heuristic information at the server system about the cloud processing services comprises:
connecting the server system to one of the cloud processing services;
confirming resources available at the cloud processing service;
running sample data using a sample algorithm on the cloud processing service; and
determining performance of the cloud processing service based on a result from running of the sample data using the sample algorithm.

9. The method of claim 8, wherein to determine, at least from the first heuristic information, the cost for processing the input data with the selected computing algorithm by the one or more determined cloud processing services, the step of compiling the first heuristic information at the server system about the cloud processing services further comprises establishing a cost structure for the cloud processing services based at least in part on the determined performance.

10. The method of claim 8, further comprising calculating, from the first heuristic information, an expected run-time for processing the input data with the selected computing algorithm by the one or more determined cloud processing services based at least in part on the determined performance.

11. The method of claim 1, wherein storing the first information about the computing algorithms comprises storing second heuristic information about the computing algorithms, whereby determining, at least from the first heuristic information, the cost for processing the input data with the selected computing algorithm by the one or more determined cloud processing services further comprises using the second heuristic information.

12. The method of claim 1, further comprising storing second heuristic information about the remote user, whereby determining, at least from the first heuristic information, the cost for processing the input data with the selected computing algorithm by the one or more determined cloud processing services further comprises using the second heuristic information.

13. The method of claim 1, wherein storing the first heuristic information at the server system about the cloud processing services comprises storing second information for use in caching the input data relative to the cloud processing services.

14. The method of claim 13, wherein storing the second information for use in caching comprises:
connecting the server system to one of the cloud processing services;
confirming hardware and communication resources available at the cloud processing service; and
compiling the confirmed hardware and communication resources into the second information for use in caching.

15. The method of claim 13, wherein in response to receiving the selection of the one or more determined cloud processing services from the remote user to perform the processing, the method comprises automatically caching the input data at at least one resource associated with the one or more determined cloud processing services based at least in part on the stored second information for use in caching the input data.

16. The method of claim 13, wherein the hardware and communication resources are selected from the group consisting of use of a virtual machine or not, size of memory, speed of memory, speed of processor, number of threads, size and performance of on-chip caches, speed of memory bus, type and speed of hard drive, type and performance of processing unit, network latency, network speed, and network performance.

17. The method of claim 1, wherein in response to receiving the selection of the one or more determined cloud processing services from the remote user to perform the processing, the method further comprises providing visual results of the computing algorithm on the input data to the remote user by processing the input data with one or more input parameters.

18. The method of claim 17, further comprising permitting the remote user to save storable results of the processing in response to payment of the determined cost.

19. The method of claim 18, wherein permitting the user system to save the storable results of the processing in response to the payment of the determined cost comprises:
    verifying the payment of the determined cost at the server system; and
    releasing a restriction on storing the storable results in response to the verified payment.

20. The method of claim 17, wherein providing the visual results of the computing algorithm on the input data to the remote user comprises:
    receiving the one or more input parameters from the remote user;
    producing perturbed results of the computing algorithm by perturbing the one or more input parameters when processing the input data; and
    generating a display of at least a portion of the perturbed results as the visual results for the remote user.

21. A non-transitory programmable storage device having program instructions stored thereon for causing a programmable control device to perform a remote data processing method, comprising:
    storing first heuristic information at a server system about a plurality of cloud processing services;
    storing first information about a plurality of computing algorithms available via the server system at one or more of the cloud processing services;
    receiving, at the server system, input data from a remote user;
    receiving, at the server system, a selection of one of the computing algorithms from the remote user;
    determining which one or more of the cloud processing services provide processing of the selected computing algorithm;
    determining, at least from the heuristic information, a cost for processing the input data with the selected computing algorithm by the one or more determined cloud processing services; and
    receiving, at the server system, a selection of the one or more determined cloud processing services from the remote user to perform the processing.

22. The programmable storage device of claim 21, wherein storing the first heuristic information at the server system about the cloud processing services comprises:
    connecting the server system to one of the cloud processing services;
    confirming resources available at the cloud processing service;
    running sample data using a sample algorithm on the cloud processing service; and
    determining performance of the cloud processing service based on a result from running of the sample data using the sample algorithm.

23. The programmable storage device of claim 22, wherein to determine, at least from the first heuristic information, the cost for processing the input data with the selected computing algorithm by the one or more determined cloud processing services, the step of storing the first heuristic information at the server system about the cloud processing services further comprises establishing a cost structure for the cloud processing services based at least in part on the determined performance.

24. The programmable storage device of claim 22, further comprising calculating, from the first heuristic information, an expected run-time for processing the input data with the selected computing algorithm by the one or more determined cloud processing services based at least in part on the determined performance.

25. The programmable storage device of claim 21, wherein storing the first information about the computing algorithms comprises storing second heuristic information about the computing algorithms, whereby determining, at least from the first heuristic information, the cost for processing the input data with the selected computing algorithm by the one or more determined cloud processing services further comprises using the second heuristic information.

26. The programmable storage device of claim 21, further comprising storing second heuristic information about the remote user, whereby determining, at least from the first heuristic information, the cost for processing the input data with the selected computing algorithm by the one or more determined cloud processing services further comprises using the second heuristic information.

27. The programmable storage device of claim 21, wherein storing the first heuristic information at the server system about the cloud processing services comprises:
    connecting the server system to one of the cloud processing services;
    confirming hardware and communication resources available at the cloud processing service; and
    compiling the confirmed hardware and communication resources into the information for use in caching of data relative to the cloud processing service.

28. The programmable storage device of claim 27, wherein in response to receiving the selection of the one or more determined cloud processing services from the remote user to perform the processing, the method comprises automatically caching the input data at at least one resource associated with the one or more determined cloud processing services based at least in part on the stored second information for use in caching the input data.

29. The programmable storage device of claim 27, wherein the hardware and communication resources are selected from the group consisting of use of a virtual machine or not, size of memory, speed of memory, speed of processor, number of threads, size and performance of on-chip caches, speed of memory bus, type and speed of hard drive, type and performance of processing unit, network latency, network speed, and network performance.

30. The programmable storage device of claim 21, wherein in response to receiving the selection of the one or more determined cloud processing services from the remote user to perform the processing, the method further comprises providing visual results of the computing algorithm on the input data to the remote user by processing the input data with one or more input parameters.

31. The programmable storage device of claim 30, further comprising permitting the remote user to save storable results of the processing in response to payment of the determined cost.

32. The programmable storage device of claim 31, wherein permitting the user system to save the storable results of the processing in response to the payment of the determined cost comprises:
    verifying the payment of the determined cost at the server system; and releasing a restriction on storing the storable results in response to the verified payment.

33. The programmable storage device of claim 30, wherein providing the visual results of the computing algorithm on the input data to the remote user comprises:
   receiving the one or more input parameters from the remote user;
   producing perturbed results of the computing algorithm by perturbing the one or more input parameters when processing the input data; and
   generating a display of at least a portion of the perturbed results as the visual results for the remote user.

34. A remote data processing system for a remote user, the system comprising:
   memory storing first heuristic data about a plurality of cloud processing services and storing first information on a plurality of computing algorithms available at one or more of the cloud processing services; and
   one or more system servers operably connected to the memory and one or more networks, the one or more system servers configured to;
   receive input data from the remote user;
   receive a selection of one of the computing algorithms from the remote user;
   determine which one or more of the cloud processing services provide processing of the selected computing algorithm;
   determine, at least from the first heuristic data, a cost for processing the input data with the selected computing algorithm by the one or more determined cloud processing services; and
   receive a selection of the one or more determined cloud processing services from the remote user to perform the processing.

35. The system of claim 34, wherein to store the first heuristic data about the cloud processing services, the one or more system servers are configured to:
   connect the system to one of the cloud processing services;
   confirm resources available at the cloud processing service;
   run sample data using a sample algorithm on the cloud processing service; and
   determine performance of the cloud processing service based on a result from running of the sample data using the sample algorithm.

36. The system of claim 35, wherein to determine, at least from the first heuristic data, the cost for processing the input data with the selected computing algorithm by the one or more determined cloud processing services, the one or more system servers are configured to establish a cost structure for the cloud processing services based at least in part on the determined performance.

37. The system of claim 35, wherein the one or more system servers are configured to calculate, from the first heuristic data, an expected run-time for processing the input data with the selected computing algorithm by the one or more determined cloud processing services based at least in part on the determined performance.

38. The system of claim 34, wherein to store the first information about the computing algorithms, the one or more system servers are configured to store second heuristic data about the computing algorithms, whereby to determine, at least from the first heuristic data, the cost for processing the input data with the selected computing algorithm by the one or more determined cloud processing services, the one or more system servers are configured to use the second heuristic data.

39. The system of claim 34, wherein the one or more system servers are configured to store second heuristic data about the remote user, whereby to determine, at least from the first heuristic information, the cost for processing the input data with the selected computing algorithm by the one or more determined cloud processing services, the one or more system servers are configured to use the second heuristic information.

40. The system of claim 34, wherein to store the first heuristic data at the server system about the cloud processing services, the one or more system servers are configured to:
   connect the system to one of the cloud processing services;
   confirm hardware and communication resources available at the cloud processing service; and
   compile the confirmed hardware and communication resources into second information for use in caching of data relative to the cloud processing service.

41. The system of claim 40, wherein in response to receiving the selection of the one or more determined cloud processing services from the remote user to perform the processing, the one or more system servers are configured to automatically cache the input data at at least one resource associated with the one or more determined cloud processing services based at least in part on the second information for use in caching the input data.

42. The system of claim 40, wherein the hardware and communication resources are selected from the group consisting of use of a virtual machine or not, size of memory, speed of memory, speed of processor, number of threads, size and performance of on-chip caches, speed of memory bus, type and speed of hard drive, type and performance of processing unit, network latency, network speed, and network performance.

43. The system of claim 34, wherein in response to receiving the selection of the one or more determined cloud processing services from the remote user to perform the processing, the one or more system servers are configured to provide visual results of the computing algorithm on the input data to the remote user by processing the input data with one or more input parameters.

44. The system of claim 43, wherein the one or more system servers are configured to permit the remote user to save storable results of the processing in response to payment of the determined cost.

45. The system of claim 44, wherein to permit the user system to save the storable results of the processing in response to the payment of the determined cost, the one or more system servers are configured to:
   verify the payment of the determined cost at the system; and
   release a restriction on storing the storable results in response to the verified payment.

46. The system of claim 43, wherein to provide the visual results of the computing algorithm on the input data to the remote user, the one or more system servers are configured to:
   receive the one or more input parameters from the remote user;
   produce perturbed results of the computing algorithm by perturbing the one or more input parameters when processing the input data; and
   generate a display of at least a portion of the perturbed results as the visual results for the remote user.

* * * * *